Figure 1:
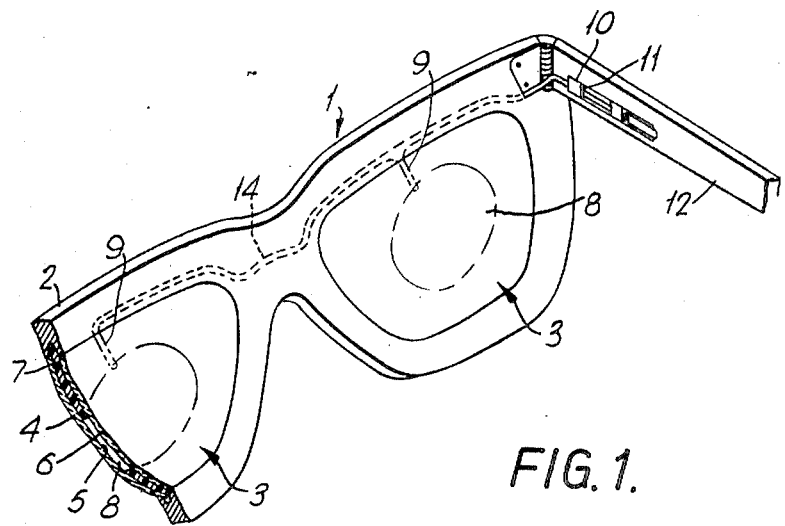

United States Patent

[11] 3,598,479

| [72] | Inventor | Basil Martin Wright<br>Croxley Green, Rickmansworth, England |
|---|---|---|
| [21] | Appl. No. | 805,717 |
| [22] | Filed | Mar. 10, 1969 |
| [45] | Patented | Aug. 10, 1971 |
| [73] | Assignee | National Research Development Corporation<br>London, England |
| [32] | Priority | Mar. 11, 1968 |
| [33] | | Great Britain |
| [31] | | 11862/68 |

[54] VARIABLE FOCUS LIQUID LENSES
1 Claim, 2 Drawing Figs.

[52] U.S. Cl. .................................................. 351/159,
351/41, 350/180
[51] Int. Cl. ...................................................... G02c 7/08,
G02b 3/12
[50] Field of Search .......................................... 351/159,
169, 41; 350/179, 180

[56] References Cited
UNITED STATES PATENTS

| 1,569,973 | 1/1926 | Goettert | 350/179 |
| 2,437,642 | 3/1948 | Henroteau | 351/41 |
| 2,576,581 | 11/1951 | Edwards | 351/41 |

FOREIGN PATENTS

| 258,325 | 9/1926 | Great Britain | 351/169 |
| 1,117,690 | 2/1956 | France | 351/159 |
| 90,267 | 4/1961 | Denmark | 351/41 |

*Primary Examiner*—David H. Rubin
*Attorney*—Cushman, Darby & Cushman

ABSTRACT: An ophthalmic lens has components respectively in the form of a meniscus and a thin resilient sheet, which are secured together so as to provide between them a cell filled with transparent liquid, the volume of liquid in the cell being variable to change the curvature of the sheet and thereby provide a continuous variation in the focus of the lens.

VARIABLE FOCUS LIQUID LENSES

This invention relates to variable focus lenses and more particularly to variable focus lenses for ophthalmic purposes.

With increasing age, the powers of accommodation of the human eye, that is the ability to vary the focal length of the eye lens when viewing near or distant objects, decreases, causing the condition known as presbyopia.

A common method of compensating for this defect is to use bifocal, or even trifocal lenses. These are composite lenses built up from lenses of differing, but fixed focal lengths. However, such lenses are not entirely satisfactory as they only bring objects at specific near and far distances into sharp focus and therefore still require some powers of accommodation on the part of the user of such lenses. Furthermore some users of such lenses experience difficulties from the nature of their occupations in viewing objects at different distances through specific areas of their lenses.

The invention consists of a variable focus lens that is suitable for ophthalmic purposes and which comprises a first component in the form of a rigid simple lens having at least one concave face, a second component in the form of a thin resilient sheet, means securing together the first and second components so as to provide between said concave face of the first component and one face of the second component a substantially centrally disposed cell which is filled with a transparent liquid, and means for varying the volume of liquid contained in the cell so as to vary the curvature of the second component.

It will be appreciated that the first component may readily be shaped so as to provide basic correction for defects, other than presbyopia, in the vision of a user of the lens.

The means securing together the first and second components of the lens may comprise a sheet of transparent plastics material sandwiched between the first and second components, and having a circular hole cut in it to provide said cell.

The means for varying the volume of liquid contained in the cell may comprise a reservoir of variable volume filled with the transparent liquid and communicating with the cell via at least one duct formed in the first component.

Figure 2:
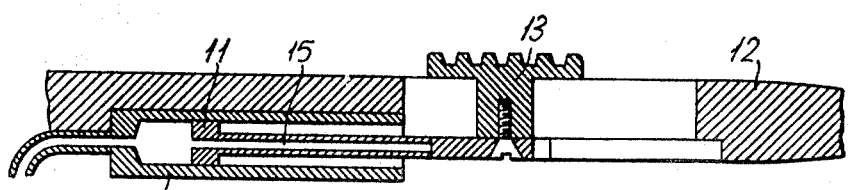

An embodiment of the invention will be described, by way of example, with reference to the accompanying drawings in which:

FIG. 1 shows a perspective view of a pair of spectacles embodying the invention; and FIG. 2 shows to a larger scale a longitudinal section of a part of the embodiment of FIG. 1.

Referring to the drawings, the pair of spectacles 1 comprise a frame 2 of a normal type in which are mounted two variable-focus lenses 3. Each lens 3 consists of three components that are laminated together. The front component 4 is a conventional spectacle lens, except that it is rather less curved than is now general practice, the curvature of the back face 5 being only about two diopters. The front face of the component 4 is optically worked to provide basic correction for defects in the vision of a person for whom the spectacles 1 are prescribed. If the person for whom the spectacles are prescribed has no defects of vision other than presbyopia, then the component 4 will, of course, be a spherically curved sheet of glass of uniform thickness. The rear component 6 is a sheet of glass of approximately 0.15 millimeter in thickness.

Between the components 4 and 6 is sandwiched a sheet of polyvinyl butyral, a transparent plastics material which adheres to glass, with a circular hole of some 25 mm. diameter cut in it and centered upon a point displaced 2 mm. vertically downwards and 2 mm. horizontally inwards with respect to the optical center of the front component 4 of the lens 3. The hole in the sheet 7 provides a cell 8 between the back face 5 of the component 4 and one face of the component 6, the part of the component 6 bounding the cell 8 being so shaped that when it is in its rest state it has a curvature about one diopter less than that of the back face 5 of the component 4.

In each lens 3 a duct 9 is drilled in the front component 4 to connect with the cell 8 so that a working liquid may be pumped into or withdrawn from the lenses 3 by means of a small cylinder 10 and piston 11 housed in the inside of one side piece 12 of the spectacles 1 and operated by means of a sliding knob 13 (see FIG. 2). The cylinder 10 is connected to the lenses 3 by means of a flexible tube 14 that passes through passages in the spectacle frame 2 and is cemented into the ducts 9 in the lenses 3. Ideally the liquid should have a refractive index equal to that of the glass used for the lens components so as to render the cells 8 and the ducts 9 invisible and to give the maximum change of refraction with a given volume change. However in practice liquids which approximate to this condition can be used. Such a liquid is a mixture of a saturated aqueous solution of calcium bromide with glycerol. The piston 11 has a hollow piston rod 15, by means of which the liquid is introduced into the operative parts of the spectacles 1 when they are assembled. The piston rod 15 is then blanked off.

In use of the spectacles 1, for distant vision the knob 13 is set so that the component 6 of each lens 3 has the same curvature as the back face 5 of the component 4. In this condition there is no change of refraction between the cell 8 and the rest of the lens 3, so that peripheral distant vision is not impaired. For nearer vision the knob 13 is moved so as to pump additional liquid into the cell 8 of each lens 3 and thereby appropriately change the curvature of that part of the component 6 bounding the cell 8. In this case clear vision is limited to the area of the cell 8, but since the user is looking directly at a fairly close object the limitation does not cause much inconvenience.

The diameter of the cells 8, although not critical, is governed by the fact that the volume of a thin lens varies as the 4th power of its diameter; thus the diameter of the cells 8 must be kept fairly small if the volumetric displacement necessary to operate the lenses 3 is to be made sufficiently small to avoid the use of a clumsy adjusting mechanism. It has been found that making the diameter of the cells 8 about 25 mm. is satisfactory, since peripheral vision when reading is not limited while the total volume displacement for the lenses 3 is only about 0.5 ml. for a variation over a range of two diopters.

As may be appreciated the lens 3 that is more remote from the cylinder 10 tends to respond to a movement of the piston 11 a little later than the nearer lens 3. This effect may be overcome either by using two cylinders similar to the cylinder 10 operated in parallel by a single knob such as the knob 13, or by providing suitably different constriction in the respective flow paths between the cylinder 10 and the cells 8 so as to match the impedances of these flow paths.

In alternative embodiments a variable focus lens in accordance with the invention may be incorporated as part of a composite lens also including a lens of fixed focal length, for example, with the variable lens replacing one component of a conventional bifocal lens.

I claim:

1. A variable focus lens suitable for ophthalmic purposes comprising a first component in the form of a rigid simple lens having at least one concave face, a second component comprising a resilient sheet of glass, an interlayer made from polyvinyl butyral sandwiched between and adherent to the concave face of said first component and to said second component, said interlayer being formed with a circular substantially aperture to provide between said concave face and one face of said second component a substantially centrally disposed cell, a duct formed in said first component and communicating with said cell, a transparent liquid having substantially the same refractive index as said first and second components filling said cell, said transparent liquid being a saturated aqueous solution of calcium bromide with glycerol, and a piston-cylinder assembly communicating with said duct for varying the volume of transparent liquid contained in said cell so as to vary the curvature of the second component in such a manner that the focusing power of said lens may be varied more than one diopter.